(No Model.) 2 Sheets—Sheet 1.

J. GROSS & J. H. MOORE.
CULTIVATOR.

No. 563,168. Patented June 30, 1896.

ATTEST
Helen Graham
William Graham

INVENTORS
John Gross,
Josiah H. Moore.
by their attorney
L. P. Graham (No Model.) 2 Sheets—Sheet 2.

J. GROSS & J. H. MOORE.
CULTIVATOR.

No. 563,168. Patented June 30, 1896.

ATTEST
Helen Graham
William Graham

INVENTORS.
JOHN GROSS.
JOSIAH H. MOORE.
by their attorney
L. P. Graham

UNITED STATES PATENT OFFICE.

JOHN GROSS AND JOSIAH H. MOORE, OF DECATUR, ILLINOIS, ASSIGNORS TO FELIX B. TAIT, OF SAME PLACE.

CULTIVATOR.

SPECIFICATION forming part of Letters Patent No. 563,168, dated June 30, 1896.

Application filed April 21, 1894. Serial No. 508,444. (No model.)

*To all whom it may concern:*

Be it known that we, JOHN GROSS and JOSIAH H. MOORE, of Decatur, in the county of Macon and State of Illinois, have invented certain new and useful Improvements in Cultivators, of which the following is a specification.

This invention relates to straddle-row cultivators. It is more particularly applicable to surface cultivation, though not confined thereto. It is exemplified in the structure hereinafter described, and it is defined in the appended claims.

Figure 1:
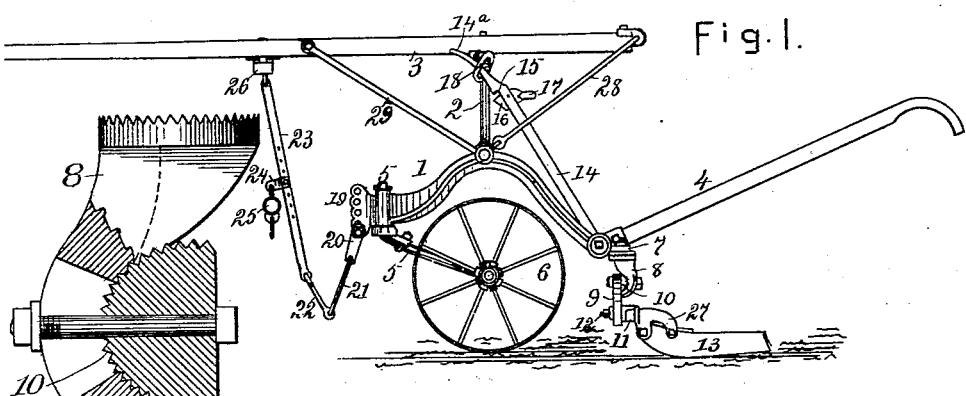
Figure 2:
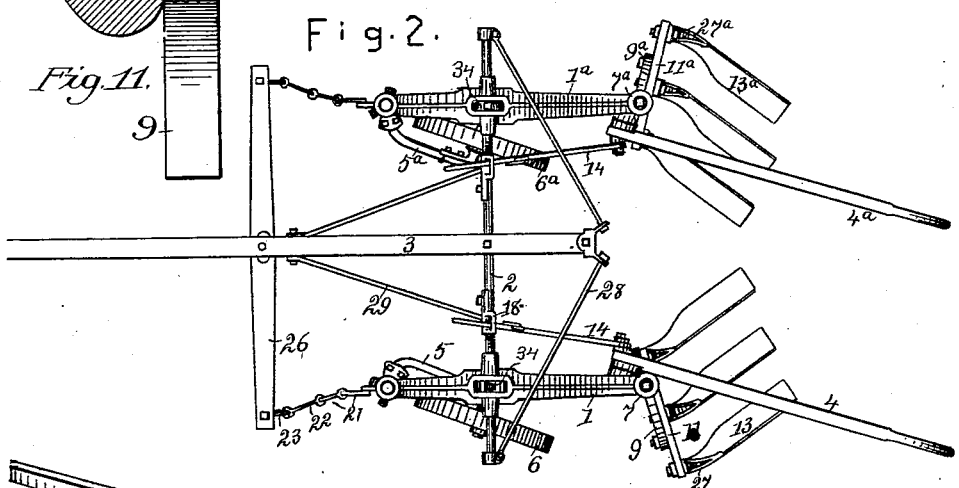
Figure 9:
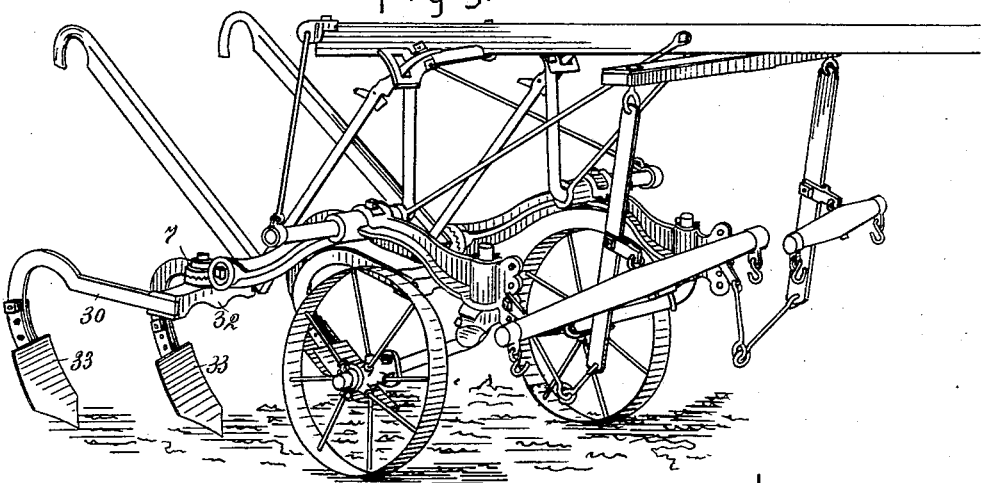
Figure 10:
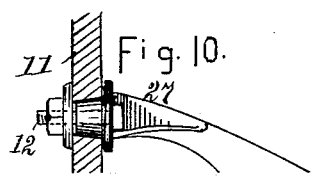

In the drawings forming part of this specification, Figure 1 is a side elevation of a cultivator embodying our improvements. Fig. 2 is a plan of the same, and it is represented in perspective in Fig. 3. Fig. 4 shows the cultivator provided with a different form of cultivating-blades. Figs. 5, 6, 7, and 8 are details showing the operation of the automatically-detachable catches on the bars used to hold the cultivating blades or shovels clear of the ground. Fig. 9 shows the cultivator provided with shovels for deep cultivation. Fig. 10 is a detail of the means employed to connect the preferred form of cultivating-blades to their cross-bar. Fig. 11 is a section through one of the adjustable joints used in connecting the cultivating-blades with the beams.

The frame of the cultivator comprises a centrally-arched shaft 2, the ends of which extend horizontally, a tongue 3, fastened to the arched part of the shaft, and braces, as 28 and 29, which extend obliquely from the tongue to the horizontal portions of the shaft, holding the arched part elevated and the entire shaft at right angles with the tongue. The braces 28 extend from the end of a rearward extension of the tongue to the outer ends of the horizontal parts of the shaft, and the braces 29 extend forward from the inner terminations of such horizontal parts and connect with the tongue in front of the shaft, such being the preferable but not invariable or indispensable arrangement. The part 2 is preferably made of a single piece bent to the form shown in the drawings, but any structure that provides the central arch and the horizontal end portions will answer the purpose of this invention.

The cultivator-beams 1 and 1ª are journaled about midway of their lengths on opposite ends of the horizontal parts or spindles of the shaft. The journal-bearings are elongated to hold the beams at right angles with the shaft, and they are preferably slotted to admit collars, as 34, which are provided with set-screws that enable the beams to be held in any desired positions on their spindles. The front end of each beam provides a vertical bearing for a caster-arm 5, which carries a caster-wheel 6, and also has a draft-head 19, provided with a number of holes at different elevations to receive the bolt of clevis 20. Bar 26, which is a form of doubletree, is connected with the tongue and provided at each end with a depending bar 23. The lower ends of bars 23 are connected with the clevises of the beams by means of links 21 and 22, and the singletrees 25 are connected with the pendulous bars by means of clevis-straps 24; but the team may be connected with the beams in any desired manner, so far as this invention is concerned, and the features enumerated in this sentence and the one next preceding are intended to illustrate a preferred, but not indispensable, way of accomplishing that result. The rear end of each beam provides a horizontal bearing for a connection between the beam and a handle 4 or 4ª, and also provides a vertical bearing for a block 8. In both cases the opposing surfaces are correspondingly corrugated, and the corrugations are utilized in making firm the different positions of the parts when they are adjusted to meet varying conditions.

Figure 3:
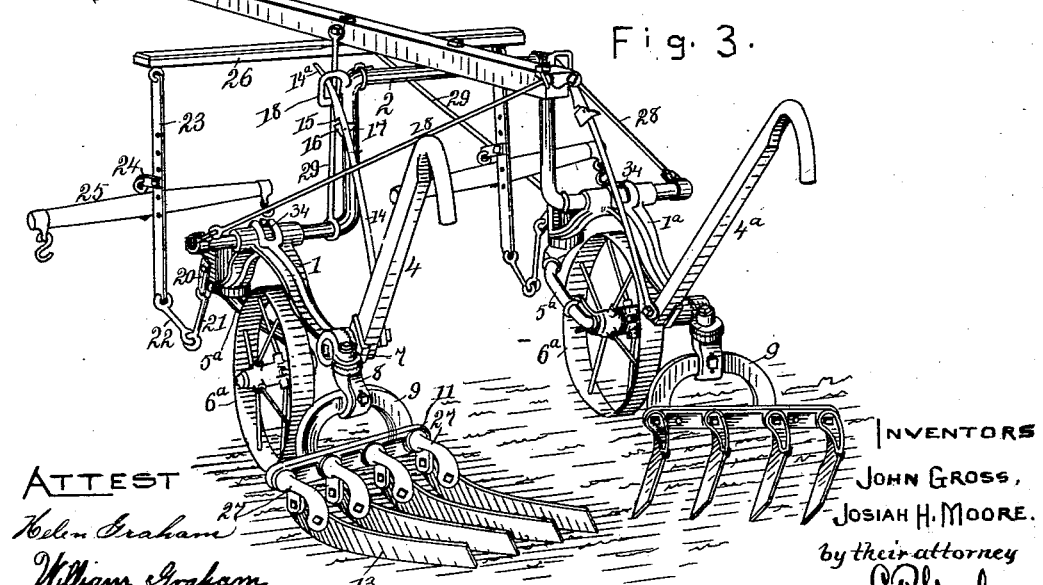
Figure 4:
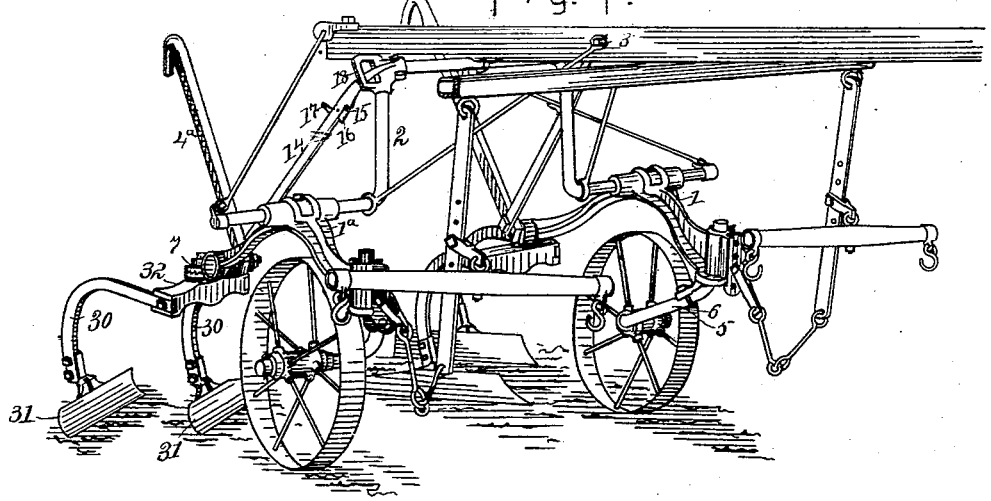

The standard 8, which is secured in vertical bearing 7, has its lower inner face concaved and corrugated, and it is slotted at right angles to the corrugated surface, as shown in Fig. 3. Arch-bar 9 has a corrugated convex surface 10, which fits the concavity of the standard, and the bolt extended through the slot of the standard and through the arch-bar secures the two parts together in a manner permitting rocking adjustment of the arch-bar. Cross-bar 11 is secured to the arch-bar at the ends thereof, and it has conical holes, as seen in Fig. 10. Brackets 27 have conical plugs which fit in holes of the cross-bar, and bolts extending through the plugs secure the brackets in the bar, as indicated in the drawings. Blades 13 are secured to brackets 27 with their longitudinal axes approximately parallel with the axes of the plugs of the brackets, so that by turning the plugs in their bearings (which may be done by loosening the bolts, making the turn, and retightening the nuts on the bolts) the edges of the blades may be presented to the ground at any desired angle. When adjusted in any particular position, the conical bearings will develop sufficient friction to hold the blades from changing their degree of inclination. By loosening the bolt of the standard, turning the arch in its bearing, and retightening the nut, the rear ends of an entire set of blades may be raised and lowered to any desired extent, and the joint between bearing 7 and the standard enables the set to be turned horizontally for the purpose of bringing one set nearer to or farther from the other set. The handles are adjustable vertically, and their adjustment enables their height to be regulated to suit the user.

Bars 14 are pivotally connected, one with each beam, and the connections are preferably made at the conjunction of the beams with the handles. Each bar has on its under side, near its upper end, a projecting catch 15, which engages the lower cross-bar of bracket 18 when the rear end of a beam is sufficiently raised, and retains the cultivating-blades from contact with the ground. The bracket has a lower cross-bar 18ª and an upper cross-bar 18ᵇ, and it is secured to the shaft at an upper angle thereof, as shown in the drawings. Of course each bar has a bracket to hold it raised, and a description of one bar and bracket will clearly illustrate both.

By referring to Figs. 5, 6, 7, and 8 the operation of the bar and the detaching-latch thereof may be described as follows: 14 is the bar, 14ª the upper curved end thereof, and 15 the catch projection. 16 is the latch, connected pivotally with the bar slightly below the catch projection and extending somewhat beyond the same. 17 is the trip-finger of the block, which projects upward above the upper surface of the bar. The cross-bars 18ª and 18ᵇ of bracket 18 are both shown in cross-section, in order that the relation of the latch thereto may not be obscured.

Figure 5:
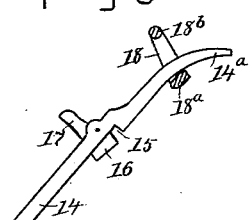

In Fig. 5 the bar occupies the position that it ordinarily maintains when the cultivator is in operation, its curved upper termination resting on the lower bar of the bracket.

Figure 6:
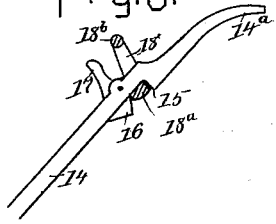
Figure 7:
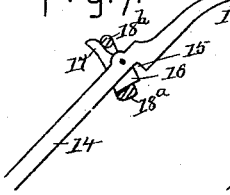
Figure 8:
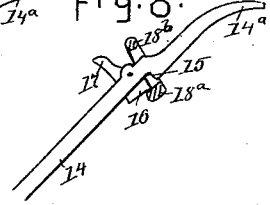

In Fig. 6 the catch 15 is shown engaging the lower bar of the bracket, and the latch is swung backward to admit the bar. This converts the lower front surface of the latch into an inclined plane which rides up the cross-bar when the rear end of the beam is sufficiently raised, and brings the parts into proper corelation to cause the latch to assume the position shown in Fig. 7, when finger 17 engages the upper cross-bar of the bracket. In this position the space between the latch and the projection is less than the width of the lower cross-bar of the bracket, and as the handle is lowered the latch carries the nose of the projection clear of the cross-bar and completely detaches the catch.

In operation the blades are set to suit the existing conditions and are held by the joints hereinbefore specified. As the beams are held parallel by their connections with the spindles of the shaft, the blades of one set maintain continuously the same relation to the blades of the other set, and the outward pull of one set is counteracted by a similar pull in the opposite direction of the other set. This gives the operator complete control of the direction of the knives, and enables him to swing the entire structure from side to side on the caster-wheels, in order to accommodate crooked rows, or for any other purpose. The wheels are under the shaft, in position to carry the load conveniently, and they also act as fulcrums to enable the draft of the team to carry the blades into the ground when the hitch is low, and to act reversely when the hitch is high. The beams are arched to enable the use of wheels sufficiently large to travel well and leave the ends in proper working position.

That part of the invention that relates to the construction and adjustment of the cultivating-blades is illustrated in Figs. 1, 2, 3, and 10 of the drawings.

In Fig. 4 the cross-head 32 is substituted for the standard 8, and curved secondary beams 30 connect with ends of the cross-head and carry blades 31, known here as "gopher" blades.

In Fig. 9 the cross-head 32 has beams somewhat similar to those shown in Fig. 4, but such beams are supplied with ordinary shovels 33. These two figures illustrate the applicability of the general structure to various kinds of cultivation, but do not introduce any features that may be made the subject of independent claims.

Having thus described our invention, we claim as new and desire to secure by Letters Patent—

1. In a straddle-row cultivator, the combination of a pair of beams held against independent horizontal swing, arms pivoted vertically one in the front end of each beam and extended rearward from the vertical pivots, wheels journaled in the arms with their fronts presented toward the vertical pivots of the arms, and cultivating devices secured to the rear ends of the beams, substantially as set forth.

2. A straddle-row cultivator in which beams are mounted to rock vertically on pivots located between their ends, are held against independent horizontal swing, are provided with caster-wheels swung from their front ends, and have cultivating devices secured to their rear ends, substantially as set forth.

3. A straddle-row cultivator in which longitudinally-arched beams are mounted to rock vertically on pivots located between their ends, are held against independent horizontal swing, are provided with caster-wheels swung from their front ends, and have cultivating devices secured to their rear ends, substantially as set forth.

4. A straddle-row cultivator comprising a tongue, an arched shaft at right angles to the tongue, arched beams pivoted on the ends of the shaft about midway of their lengths, caster-wheels swung from the front ends of the beams, and cultivating devices secured to the rear ends of the beams, substantially as set forth.

5. In a cultivator, the combination with beam 1, of standard 8 concaved and corrugated in its lower, front face and slotted at right angles to the corrugated surface, the blade-bearing arch-bar 9 having a convex corrugated surface adapted to the concavity of the standard, and the bolt to bind the arch-bar to the standard, substantially as set forth.

6. In a cultivator, the combination with beam 1, of standard 8, arch-bar 9, cross-bar 11, brackets 27, and blades 13, all connected together as specified.

7. The combination of a sustaining-bar, as 14, having a catch projection, as 15, formed in the bar a latch as 16, pivoted on the sustaining-bar and having an upward-extending trip-finger, as 17, a relatively-immovable cross-bar, as $18^a$, adapted to engage the catch projection of the sustaining-arm, and a second cross-bar, as $18^b$, adapted to actuate the trip-finger, substantially as set forth.

In testimony whereof we sign our names in the presence of two subscribing witnesses.

JOHN GROSS.
JOSIAH H. MOORE.

Attest:
EDWARD C. BASSEY,
L. P. GRAHAM.